Figure 1:
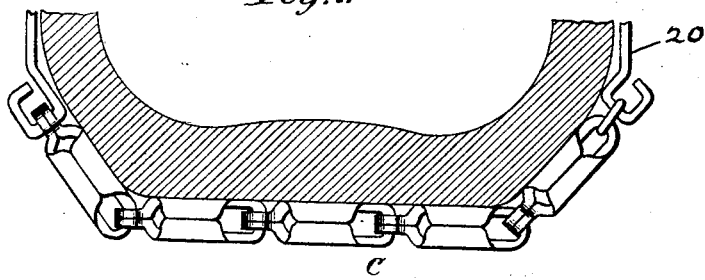

P. T. HAMM.
ANTISKID DEVICE FOR TIRES.
APPLICATION FILED FEB. 21, 1910.

979,160.

Patented Dec. 20, 1910.
2 SHEETS—SHEET 1.

Witnesses
Chas. W. LaRue
Allan W. Foose.

Inventor:
Philip T. Hamm
by Wilbur M. Stone
Attorney

P. T. HAMM.
ANTISKID DEVICE FOR TIRES.
APPLICATION FILED FEB. 21, 1910.
979,160.
Patented Dec. 20, 1910.
2 SHEETS—SHEET 2.
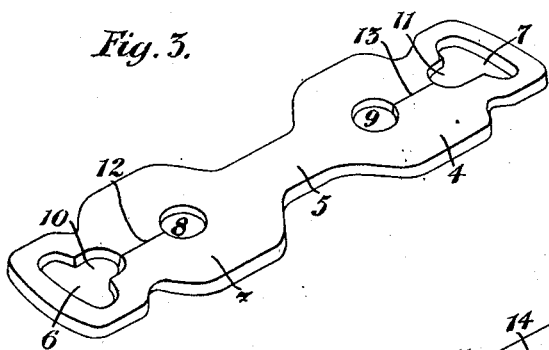
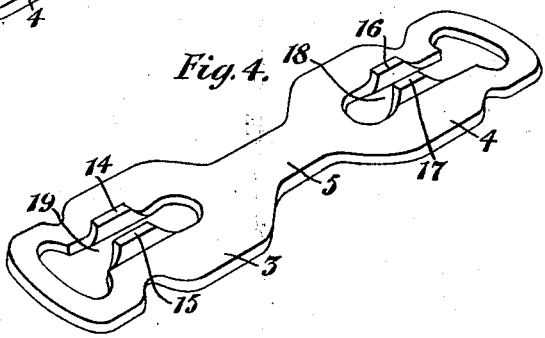
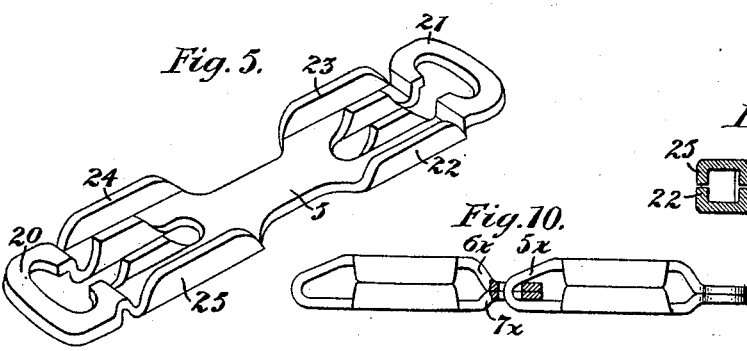
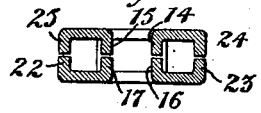
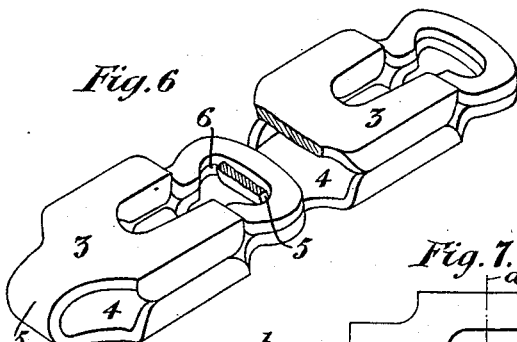
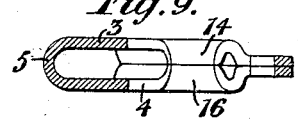
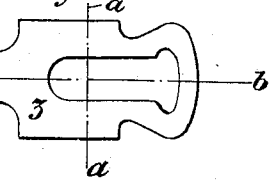
Witnesses
Chas. W. La Rue
Allan H. Fooser
Inventor
Philip T. Hamm
by Wilbur M. Stone
Attorney.

UNITED STATES PATENT OFFICE.

PHILIP T. HAMM, OF NEW YORK, N. Y., ASSIGNOR TO ATLAS CHAIN COMPANY, OF NEW YORK, N. Y., A CORPORATION OF NEW YORK.

ANTISKID DEVICE FOR TIRES.

979,160.  Specification of Letters Patent.  Patented Dec. 20, 1910.

Application filed February 21, 1910. Serial No. 545,025.

*To all whom it may concern:*

Be it known that I, PHILIP T. HAMM, a citizen of the United States, and a resident of New York city, in the county of Kings and State of New York, have invented certain new and useful Improvements in Antiskid Devices for Tires, of which the following is a specification.

This invention relates to anti-skid devices for tires commonly known as tire chains and used on tires of motor vehicles to prevent the slipping and skidding of the tires on the road.

The object of my invention is to furnish an improved cross member for the tread, consisting of links that can be simply and inexpensively made from sheet metal blanks, the links being flexibly connected by means integral with such links and being so formed that the tread surface thereof will have an efficient hold upon the road and so constructed that they are reinforced in an improved manner against crushing.

In the drawings accompanying this specification my invention is illustrated in its preferred embodiment wherein—

Figure 2:
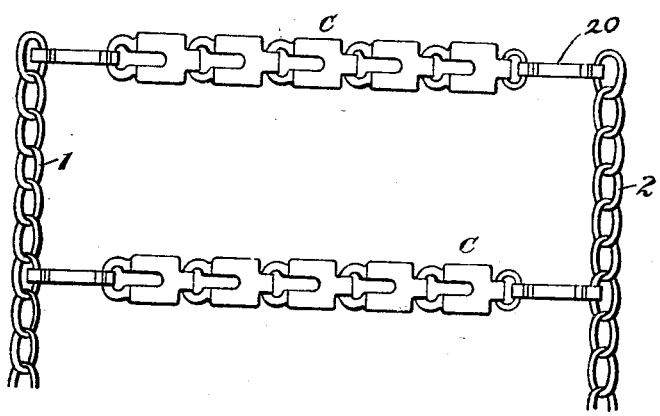

Figure 1 is a section of a portion of a tire showing the chain in position thereon and under compression from the weight of the machine. Fig. 2 is a plan view of a section of my device showing the side chains and two of the cross members. Fig. 3 shows a blank made from a piece of sheet metal from which each link is formed. Fig. 4 shows the same partly formed by the upward bending of the portions adjoining the longitudinal slots. Fig. 5 shows the next steps in formation, side portions having been bent upwardly and the eye portions offset from the plane of the body portion. Fig. 6 shows two of the formed links joined together, parts being broken away for clearer illustration. Fig. 7 is a plan view of a single link. Fig. 8 is a section on line *a—a* of Fig. 7 and Fig. 9 is a section on line 6—6 of Fig. 7. Fig. 10 illustrates a modification of jointure arrangement.

In Figs. 1 and 2 my improved chain as illustrated includes side members 1 and 2, which may be of ordinary chain construction. Cross members C lie between said side members and are connected thereto by suitable links as 20. Each cross member C is made up of a plurality of links, five being shown in the present embodiment. Each of these links is formed from a blank as shown in Fig. 3, comprising two flat portions 3 and 4 connected by a narrower portion 5. At the outer ends of portions 3 and 4 are eye portions 6 and 7 respectively, having elongated transverse eyes of the same size and shape. The blank is perforated by holes 8 and 9 and recesses 10 and 11 reach inwardly from eyes 6 and 7, respectively. Slits 12 and 13 connect holes 8 and 9 with recesses 10 and 11, respectively and are provided to allow the bending upward of lugs 14, 15, 16 and 17 (Fig. 4) thus providing slots 18, 19 in said link. The eye portions are also bent upwardly as at 20 and 21, Fig. 5 to some extent so that in the later bending said eye portions will be brought together face to face, as shown in Figs. 6 and 9. Before folding the blank upon itself to bring eye portions 6, 7 together, edges of portions 3, 4 are bent upwardly to form supports 22, 23, 24 and 25. The partly bent blank is now folded at its narrower portion 5 and portions 23 and 24 and portions 22 and 25 respectively brought together edge to edge thus bringing flat portions 3 and 4 into parallelism, but offset or spaced apart from each other.

After one link has been entirely formed as shown in the lower right hand portion of Fig. 6, a second link, as shown in Fig. 5 or partially bent at 5, is passed through longitudinal slot 18 to its midportion 5 and shifted to eye portion of said first link and said second link is closed, whereby said links are articulated as shown in said Fig. 6. This is accomplished by inserting one end of a partially bent link transversely of its normal position into the slot 18 of a previously bent link, this slot, together with the eye-portions 6 and 7, being longer than the width of the eye-portions of the bent link, until the narrower or neck portion 5 of the inserted link is in position to be turned around within the eye-portions 6 and 7, whereupon the inserted link can be bent at its narrow portion to thus articulate the two links together, in a manner which will be readily understood. Of course, if one only of the parallel portions of the link is provided with an eye and a slot the links could be articulated together in precisely the same manner before the parallel portions of the two links are brought into parallelism.

Fig. 10 illustrates a modified arrangement of the eye portion of my improved link wherein eye portions 6× and 7× do not meet along the medial plane of the link, but between said medial plane and the lower face of the link. Narrow portion 5× of the connecting link is so bent as to present its connecting portion with the adjacent link in the offset plane of members 6×, 7×. The offsetting of these connecting portions serves as a protection against abrasion in use.

There is thus provided a light, strong and simple link of integral construction and which can be easily articulated with other links.

I claim:

1. In an anti-skid device for tires, a link formed from an integral blank, and comprising two offset parallel portions connected by a bent narrower portion, the parallel portions having their side edges bent into engagement to support such parallel portions offset, and eye portions at the opposite end of the members from the said bent portion through which passes the bent portion of the adjacent link, said parallel portions each having a longitudinal slot extending from the said eye portion permitting admission of the adjacent link member whereby to articulate the links.

2. In an anti-skid device for tires, a link formed from an integral blank, and comprising two offset parallel portions connected by a bent narrower portion, the parallel portions having their side edges bent into engagement to support such parallel portions offset, and eye portions at the opposite end of the members from the said bent portion through which passes the bent portion of the adjacent link, said parallel portions each having a longitudinal slot extending from the said eye portion permitting admission of the adjacent link member whereby to articulate the links, said parallel faces having portions bent inwardly into engagement at the margins of said slots.

3. In an anti-skid device for tires, a link formed from an integral blank, and comprising two offset parallel portions connected by a bent narrower portion, the parallel portions having their side edges bent into engagement to support such portions offset, each parallel portion having an eye portion at the opposite end from the said bent portion through which passes the bent portion of the adjacent link, the eye portion being contiguous and offset from the parallel portions, said parallel portions each having a longitudinal slot extending from the said eye portion permitting admission of the adjacent link member whereby to articulate the links, said parallel faces having portions bent inwardly into engagement at the margins of said slots.

4. In an anti-skid device for tires, a link formed from an integral blank and comprising two offset or spaced apart parallel portions having their side edges bent into engagement to support such parallel portions spaced apart, said link having an eye-portion through which passes the bent portion of an adjacent link, said link also having a longitudinal slot opening into the eye-portion to permit the admission of an adjacent link, thereby to articulate the links.

5. In an anti-skid device for tires, a link formed from an integral blank and comprising two offset or spaced apart parallel portions having means for holding such parallel portions spaced apart, said link having an eye-portion and a longitudinal slot opening into and of less width than such eye-portion for the entrance of an adjacent link, thereby to articulate the links.

6. In an anti-skid device for tires, a cross member comprising a plurality of links each formed from an integral blank and having spaced apart members, one comprising a relatively flat road engaging portion provided with a narrow bent articulating portion and an eye portion of less width than the maximum width of the link and with a longitudinal slot opening into and of less width than said eye portion for the admission of a similar companion link, thereby to articulate the links, the longitudinal slot and eye portion combined having greater length than the width of the eye portion.

7. In an anti-skid device for tires, a link formed from an integral blank comprising two offset parallel portions connected by a bent narrower portion, said link having an eye-portion at the opposite end of the link from the bent portion thereof and having a longitudinal slot opening into and of less width than said eye-portion to permit the admission of an adjacent link thereby to articulate the links.

8. In an anti-skid device for tires, a link formed from an integral blank and comprising two off-set parallel portions connected by a bent narrower portion, portions to support said parallel portions off-set, and eye portions at the opposite end of the members from the said bent portion through which passes the bent portion of the adjacent link, said parallel portions each having a longitudinal slot extending from the said eye portions permitting admission of the adjacent link member whereby to articulate the links.

9. In an anti-skid device for tires, a link formed from an integral blank and comprising two off-set portions connected by a bent narrower portion, a portion to support said portions off-set, and an eye at the end of the link opposite the said bent portion and through which eye passes the bent portion of the adjacent link, and also having a longitudinal slot extending from the said eye portion for permitting admission of the adjacent link whereby to articulate the links.

Signed this eighteenth day of February, nineteen hundred and ten (1910) in the Park Row Building, New York, N. Y., before two subscribing witnesses.

PHILIP T. HAMM.

Witnesses:
MAURICE H. CORMACK,
ROBERT N. EVANS.